United States Patent [19]

Perry

[11] 3,887,216
[45] June 3, 1975

[54] VEHICLE STEP ASSEMBLY
[75] Inventor: Gary D. Perry, Lubbock, Tex.
[73] Assignee: Eagle-Picher Industries, Inc., Cincinnati, Ohio
[22] Filed: Aug. 5, 1974
[21] Appl. No.: 495,123

[52] U.S. Cl.................................. 280/163; 182/90
[51] Int. Cl. ............................................. B60r 3/02
[58] Field of Search ...... 280/163, 164, 166; 182/89, 182/90, 196

[56] References Cited
UNITED STATES PATENTS

| | | | |
|---|---|---|---|
| 384,665 | 6/1888 | Zistel | 280/164 A |
| 547,158 | 10/1895 | Root | 182/90 |
| 3,083,785 | 4/1963 | Hyman | 182/89 |
| 3,826,337 | 7/1974 | Ziptak | 280/166 |
| 3,834,492 | 9/1974 | Ronk | 182/196 |

Primary Examiner—Robert R. Song
Attorney, Agent, or Firm—Cushman, Darby & Cushman

[57] ABSTRACT

A flexible step assembly for use with a tractor or other vehicle is constructed from a loop of strong elastomeric material having a horizontal metal step plate secured inside the loop at its lower end and having a horizontal reinforcing plate clamping the upper end of the loop to a rigid horizontal surface on the vehicle. The ends of the plates facing the loop are rounded to reduce abrasion and cutting forces on the loop when the latter is deflected by striking an obstacle during use of the vehicle.

5 Claims, 6 Drawing Figures

VEHICLE STEP ASSEMBLY

BACKGROUND AND SUMMARY OF THE INVENTION

The present invention relates to a deflectable step assembly for use with vehicles, such as tractors and earthmoving scrapers that are too high off the ground to be easily mounted without a step and that are operated in rough terrain under conditions such that the assembly is apt to strike the ground or other obstacles during use.

It is known to provide a deflectable step for mounting such vehicles, but the problems of providing a step that has all the desired characteristics of strength, deflectability when struck, stiffness when mounted, and resistance to abrasion have not been completely solved. A step assembly is generally mounted on a vehicle in a position such that the longitudinal dimension of the step plate is parallel to the direction of movement of the vehicle, and when so mounted the step plate should be deflectable longitudinally, that is horizontally in a forward or rearward direction with respect to the long dimension of the step plate. The step plate should also be deflectable upwardly, but in order to be easily and safely mounted it should be rather stiff with respect to transverse displacement, that is horizontal displacement in a direction at a right angle to the long dimension of the step plate. It is also desirable that the assembly be capable of withstanding the deflections which occur during use, without rapidly wearing out due to fraying or other stress-induced weakening at the points of flexing.

While the prior art step asemblies have been generally satisfactory in performing their primary function, they have often been subject to some sort of deformation or concentrated stress resulting in excess wear during operation of the vehicle in rough terrain, or else they have not supplied the necessary resistance to the horizontal component of the force of a man stepping on the step to mount the vehicle. In particular the prior art devices, of which U.S. Pat. Nos. 3,083,785 and 3,603,429 are representative examples, suffer considerable damage when subjected to an upwardly directed force such as results when the vehicle rides over a large steep bump and bounces the step into contact with the ground or other object, nor are they free from concentrated stresses, resulting in shorter life or requiring more expensive materials, when acted on by a horizontally directed force along the direction of movement of the vehicle.

The step assembly of the present invention is constructed in a manner which provides improved performance and long life together with economy of manufacture. According to the principles of the present invention, a strap made of rubber or similar flexible but strong material is formed generally into the shape of a loop. Rigid horizontal plates having rounded end edges for engagement with the inside surfaces of the loop are then mounted within the loop at the top and bottom thereof. The upper plate is then attached to a convenient downwardly facing horizontal surface on the vehicle in a manner to clamp the upper part of the loop to the vehicle. The lower plate serves as a step plate for mounting the vehicle. One or more intermediate step plates may be secured between the upper and lower plates if desired. The plane of the loop is parallel to the longitudinal axis of the vehicle, and thus the width dimension of the strap is transverse to such axis so as to resiliently resist transverse swinging of the loop when the vehicle is mounted. Abrasion of the material of the strap by the ends of the upper and lower plates upon flexing of the strap is substantially prevented by providing the ends of the plates with rounded edges, and in the preferred embodiment these edges are defined by beads, the beads on the clamping plate projecting slightly downwardly and the beads on the step plate facing slightly upwardly.

Accordingly, it is the object of the present invention to provide an improved step assembly for a vehicle operated in rough terrain which is sufficiently rigid to allow easy mounting of the vehicle by an operator for the vehicle yet which is sufficiently flexible as not to be damaged by upward vertical forces and horizontal forces parallel to the direction of movement of the vehicle under normal operating conditions.

It is a further object of the present invention to provide a step of the above type which is relatively inexpensive to manufacture and easy to install yet has a long service life.

These and other objects of the invention will become apparent from the following more detailed description of an illustrative embodiment of the invention, taken with the drawings in which.

DETAILED DESCRIPTION OF THE INVENTION

Figure 1:
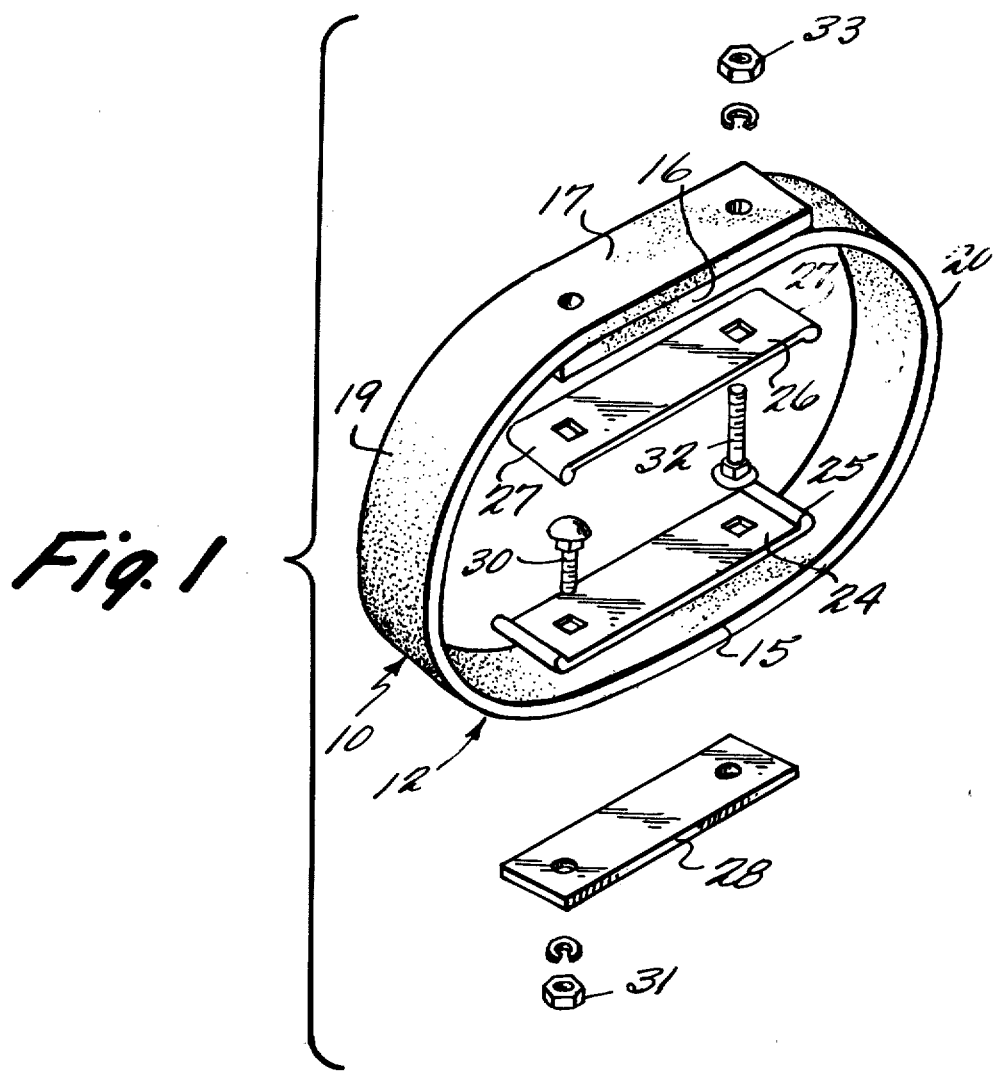
FIG. 1 is a perspective view of an exemplary step assembly according to the teachings of the present invention.

A step assembly 10 according to the teachings of the present invention is shown mounted on any convenient portion of the frame 11 of a vehicle adapted to operate in rough terrain. The step assembly 10 comprises a strap 12 of tough, strong flexible material, such as rubber, having significant thickness and width to provide strength enough to support a man's weight and formed generally in the shape of a loop. The loop so formed from the strap 12 has relatively straight end portions 16 and 17, a relatively straight bottom portion 15, and side arm portions 19 and 20. In the drawings, the end portions 15 and 16 are shown to be overlapped. While overlapping the end portions provides extra strength at the mounting portion of the loop, and provides for more curvature of arm portion 19 relative to the one edge 27 of plate 26, the loop could also be formed by merely bringing the ends of the strap into contact with each other, or leaving a gap therebetween. The strap 12 may also be formed as a continuous loop having no ends. The general plane of the loop is parallel to the direction of movement of the vehicle, but it is not necessary that this plane be absolutely vertical.

At the lower end of the looped strap 12 is a rigid step plate 24 secured inside the loop by means of a second plate 28 disposed outside the loop and fastened to the step plate 24 with the strap clamped therebetween, as by means of bolts 30 and nuts 31. As shown the plate 28 is generally coextensive with the step plate 24 so as to reinforce the latter. At the upper end of the looped strap is a clamping or fastening plate 26 which is secured to a downwardly facing horizontal surface of the vehicle frame 11, as by means of bolts 32 and nuts 33, with the overlapped ends 16, 17 of the strap clamped between the plate 26 and the frame 11. The width of the plates 24, 28 and 26 is about equal to the width of the strap 12 to avoid abrasion of the latter by the longitudinal edges of the plates.

The ends of the step plate 24 and of the clamping plate 26 are rounded at 25 and 27, respectively, to prevent the stresses exerted on the strap 12 when it is deflected from resulting in excessive wear of the strap 12. More specifically, the rounded edges 25 and 27 are beads having generally semispherical surfaces which tend to engage the inner surface of the strap 12 during flexing of the latter. To this end the beads on the clamping plate 26 project slightly downwardly, and the beads on the step plate 24 project slightly upwardly. The beads may be formed by welding a length of cylindrical rod to each end of each of the plates 24 and 26.

Figure 2A:
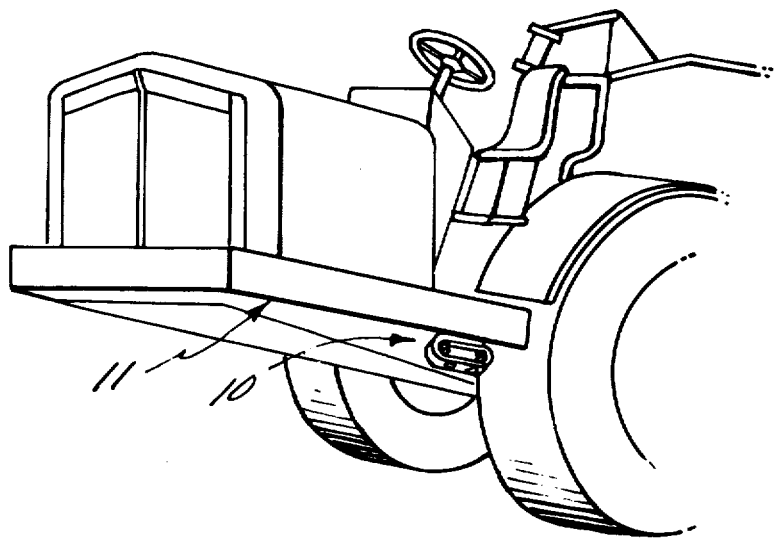
FIG. 2a is a diagrammatic view of the step assembly in place on a typical vehicle with the step in its normal position.
Figure 2B:
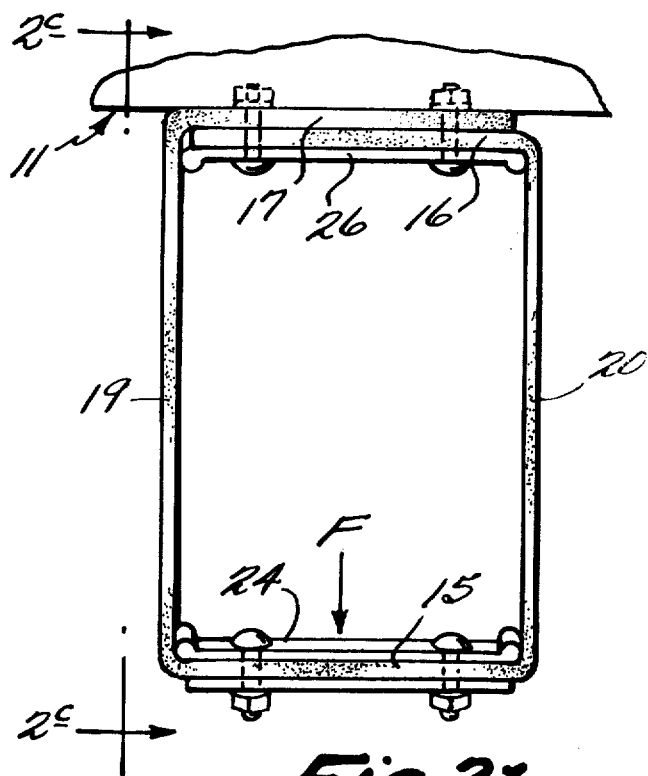
FIG. 2b is an elevational view of the step assembly showing its position upon being acted on by a downward force such as would be caused by a person mounting the vehicle.
Figure 2C:
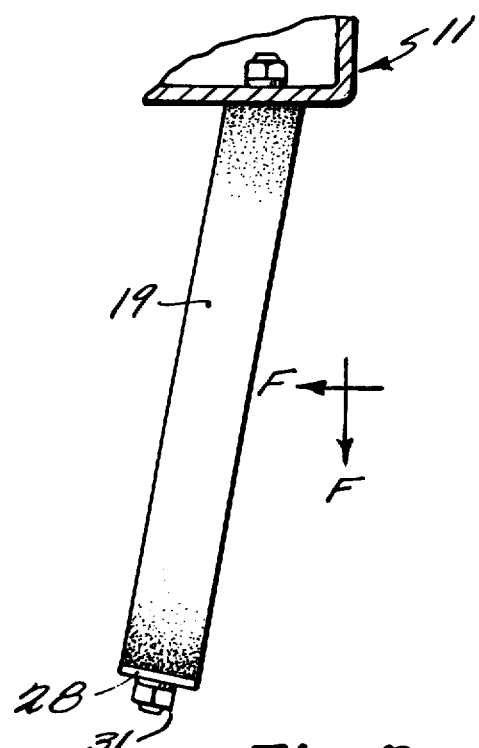
FIG. 2c is a view of the step assembly in the same condition as in FIG. 2b taken along lines 2c—2c of FIG. 2b.

When the step assembly is fixed to the vehicle and no forces are being applied it assumes the position shown in FIG. 2a with the arms 19 and 20 curved outwardly. Upon an operator's stepping on the step plate 24 and the strap portion 15 to mount the vehicle, the strap 12 will deform as shown in FIGS. 2b and 2c. The arms 19 and 20 are no longer curved but assume a straight configuration as long as the downward force is applied. The horizontal transverse component of the stepping force, FIG. 2c, causes the whole strap 12 to deflect inwardly of the edge of the vehicle frame 11; however due to the mounting of the strap and its relatively large width and sufficient strength, this horizontal displacement perpendicular to the plane of the loop is not very large and does not hinder a person in stepping up on the vehicle.

Figure 2D:
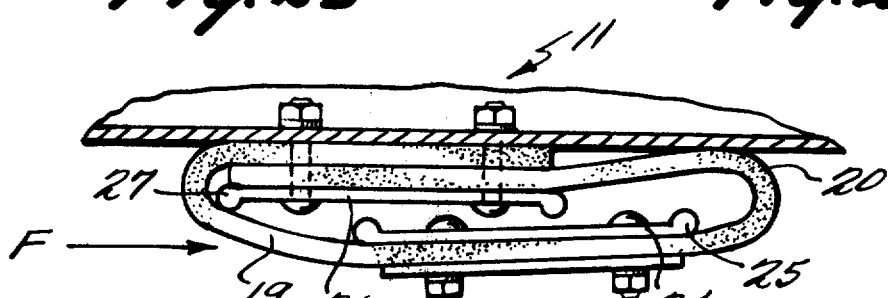
FIG. 2d is an elevational view of the step assembly showing the step assembly in the position to which it is moved by a horizontal force parallel to the plane of the loop.
Figure 2E:
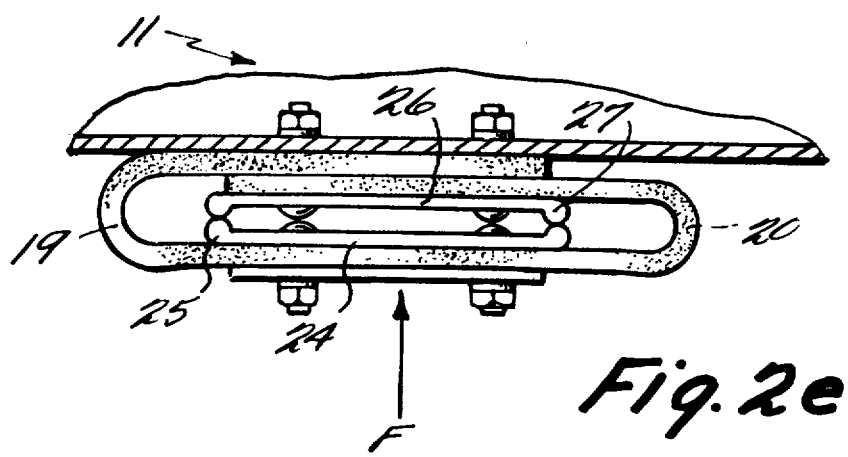
FIG. 2e is an elevational view of the step assembly showing the step assembly in the position to which it is moved by an upwardly directed force.

When the vehicle is being operated and strikes an object in its path of movement, a horizontal force parallel to the plane of the loop will be applied and cause deflection as shown in FIG. 2d. In such a case, as in the case of FIGS. 2b and 2c, only the rounded edges 25, 27 of the plates 24, 26 respectively will be engaged by the strap 12. The rounded portions of the plates will engage only the curved surfaces of the strap thereby resulting in no concentration of stresses. When the step assembly 10 is subjected to an upwardly directed force, such as when the vehicle rides over a steep bump and bounces back toward the ground, the strap 12 will be deformed as shown in FIG. 2d.

It will be clear that the step assembly according to the teachings of the present invention may be easily installed on existing vehicles, and that it is relatively inexpensive to manufacture, its component parts being inexpensive.

A step assembly has been disclosed that allows easy mounting of a vehicle to which it is attached while being deformable in response to upward forces and horizontal forces parallel to the plane of the step assembly without significant wear thereof. While the invention has been shown in what is presently conceived to be the most practical and preferred embodiment, it is apparent that many modifications are possible within the scope of the invention, which scope is not to be limited except by the appended claims.

What is claimed is:

1. A step assembly for use with a vehicle to be operated in rough terrain, said step assembly comprising
   a. a loop of flexible material, said loop having sufficient strength to support the weight of a man, and sufficient width and strength to resist the horizontal displacement of said step assembly when assembled and subjected to the horizontal component of the force of a man stepping on said step assembly,
   b. a step plate attached to the inside portion of the bottom of said loop,
   c. a clamping plate attached to the inside portion of the top of said loop, and
   d. means for clamping said clamping plate to a generally downwardly facing mounting surface on the vehicle frame.

2. A step assembly as recited in claim 1 wherein said loop is formed of a strap having overlapped ends clamped between the clamping plate and the mounting surface.

3. A step assembly as recited in claim 1 wherein the edges of said step plate and said clamping plate corresponding to the width of said strap are rounded so that only rounded portions of the interior of said loop and said plates engage each other during any deformation of said step assembly.

4. A step assembly as recited in claim 1 wherein the lower end of the loop is clamped between said step plate and a reinforcing plate which engages the outer surface of the bottom of the loop.

5. In a vehicle which travels over rough and irregular terrain a mounting step assembly comprising a generally horizontal step plate disposed on the inside of the lower end of a loop of strong tough flexible material, said loop having a bottom portion fastened to the lower surface of said step plate, said bottom portion being continuous with two upwardly directed arms which are engaged by the ends of said step plate, said ends having upwardly directed generally semicylindrical beads thereon so as to reduce wear on said arms during flexing of said arms, and means fastening the upper ends of said arms to the vehicle.

* * * * *